F. W. Smith,
Artificial Teeth
Nº 60,583.          Patented Dec. 18, 1866.
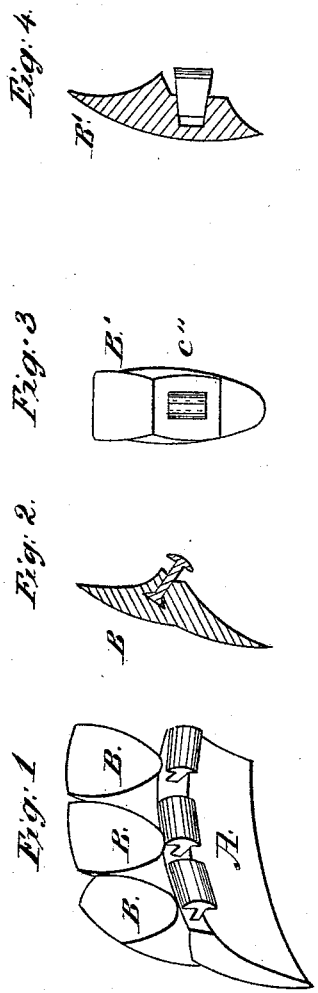
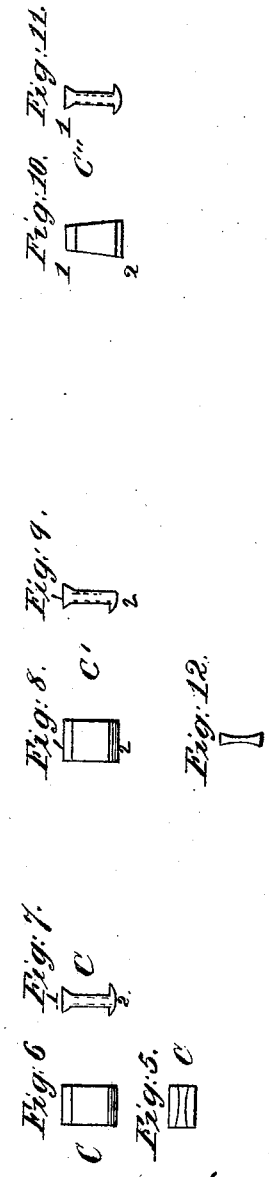
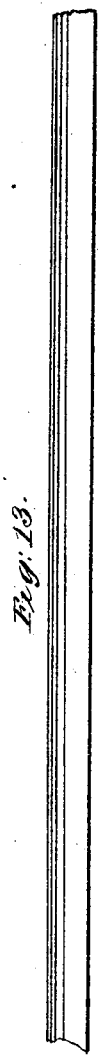
Witnesses:
Simeon Boerum
C. P. Hinckle
Inventor:
Francis W. Smith
By his Atty.
Stephen Ustick

United States Patent Office.

IMPROVEMENT IN ARTIFICIAL TEETH.

FRANCIS W. SMITH, OF PHILADELPHIA, PENNSYLVANIA.

Letters Patent No. 60,583, dated December 18, 1866.

*The Schedule referred to in these Letters Patent and making part of the same.*

TO ALL WHOM IT MAY CONCERN:

Be it known that I, FRANCIS W. SMITH, of the city and county of Philadelphia, and State of Pennsylvania, have invented a new and useful Improvement in Artificial Teeth; and I do hereby declare that the following is a full and exact description thereof, reference being had to the accompanying drawings, and to the letters of reference marked thereon.

The nature of my invention and improvement consists in peculiar-formed platinum plates for confining artificial teeth to vulcanized rubber, metallic, or other plates, the said platinum plates being constructed and combined with teeth and plates substantially as follows. In the accompanying drawings, which are on an enlarged scale—

Figure 1 is an inside view of a block of teeth on my improved plan.
Figure 2 is a vertical cross-section of do.
Figure 3 is a front view of a single tooth having a plate, C″.
Figure 4 is a vertical section of do.
Figure 5 is a cross-section of one of the plates, C.
Figures 6 and 7 are a side and edge views of do.
Figures 8 and 9 are similar views of a plate, C′.
Figures 10 and 11 are like views of a plate, C″.
Figures 12 and 13 are an end and side views of a portion of a strip drawn from platinum wire for the construction of plate C.

Like letters in all the figures indicate the same parts.

A, fig. 1, is a block of teeth, B B B, which have platinum plates, C C C, combined therewith to fasten the block to a base-plate of vulcanized rubber or other material. One of the plates, C, is represented in detail in figs. 5, 6, and 7. While the teeth are in a plastic state, before being baked, the ends, 1, of the plates, C, are inserted therein, as represented in fig. 2, the end, 2, projecting inside of the block A, to secure the latter to the base-plate, as seen in figs. 1 and 2. C,′ figs. 8 and 9, is a plate like plate C, with the exception that one of the flanges on the concave head, 2, is left off. Plates of this description I usually combine with teeth that have a short bite, making the flanged part of the head 2 to project inwards towards the body of the base-plate. For single teeth I use plates, C″, as represented in figs. 10 and 11. In short teeth I place the plates crosswise, as represented in figs. 1 and 2, and longitudinally in long teeth, as seen in figs. 3 and 4. In constructing the combining plates C, I draw platinum wire into strips of double concave form, as represented in figs. 12 and 13, and form the plates therefrom by means of dies in suitable machinery. Two dies at right angle to the strip are made to form the flanged head 1, and cut off the strip at one operation. The convex head 2 is formed by means of a punch, arranged in line with the strip. I adopt the concave form of the plates for the purpose of getting the greatest strength with a certain amount of material.

Having thus described my improvement in artificial teeth, what I claim as new, and desire to secure by Letters Patent, is—

The use of flanged headed plates constructed substantially as described, out of strips drawn from platinum wire, for confining artificial teeth to vulcanized gum, or other plates, as above specified and shown.

In testimony whereof I have hereunto set my hand and affixed my seal, this thirty-first day of August, 1866.

FRANCIS W. SMITH. [L. S.]

Witnesses:
STEPHEN USTICK,
JOHN WHITE.